Figure 1:
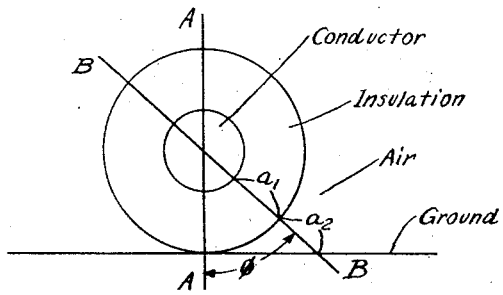

Feb. 3, 1931. G. J. CROWDES 1,791,402
ELECTRIC CABLE
Filed March 30, 1928 2 Sheets-Sheet 1

INVENTOR
George J. Crowdes
BY
ATTORNEYS

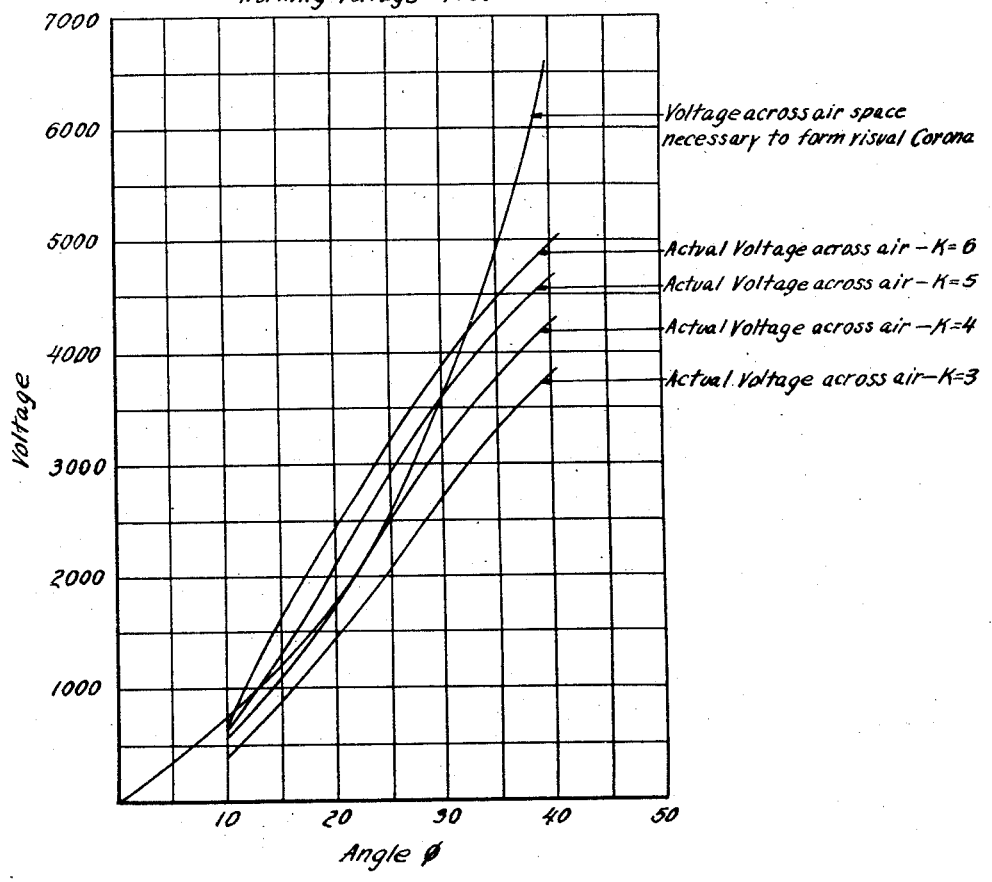

Patented Feb. 3, 1931

1,791,402

UNITED STATES PATENT OFFICE

GEORGE JACKSON CROWDES, OF DORCHESTER, MASSACHUSETTS, ASSIGNOR TO SIMPLEX WIRE AND CABLE COMPANY, OF BOSTON, MASSACHUSETTS, A CORPORATION OF MASSACHUSETTS

ELECTRIC CABLE

Application filed March 30, 1928. Serial No. 266,095.

This invention relates to improvements in the construction of rubber insulated electric power cables designed for alternating current operation under high voltages, for example, 2300 volts and upwards.

In actual service, such insulated electric cables come in contact, on one side at least, with grounded or partially grounded surfaces with the result that the air spaces adjacent such cables, particularly adjacent such points of contact, are placed under a voltage stress. With commercial thicknesses of rubber insulation, as such cables have previously been constructed, this stress across such air spaces is almost always so great that the formation of visual corona or other destructive discharges or ozone takes place when the cable is in operation.

Such formation of visual corona or other destructive discharges or ozone seriously interferes with the successful operation of rubber insulated high voltage electric power cables because of its effect upon the electrical properties of the rubber insulation. In some cases deterioration of the cable insulation under the conditions prevailing in operation takes place more slowly than in others, in some cases the deteriorating influences are less severe than in others and some types of insulation are more resistant to such deteriorating influences than others, but the useful life of such rubber insulated cables is usually terminated as a result of such formation of visual corona or other destructive discharges or ozone.

Hitherto, the only real method of attack on this problem has been the sheathing of the rubber insulated cable in a grounded metallic jacket to remove such voltage stress from air spaces adjacent the cable. This method is expensive, such cable construction is necessarily heavy, and it is not well adapted to uses where flexibility or portability is important.

I have discovered that, by providing rubber insulation of sufficiently low means specific inductive capacity, a cable can be constructed in which such a large proportion of the voltage stress between the conductor or conductors in the cable and the ground is taken by the rubber insulation itself that the voltage stress in air spaces adjacent the cable is insufficient to cause the formation of visual corona or other destructive discharges or ozone.

I can best explain my invention by pointing out that each elementary section through the cable and an adjacent air space between the conducting element and a grounded or partially grounded surface comprises two condensers in series, one condenser through the cable insulation and another condenser through the adjacent air space. The voltage along any such elementary section is distributed in inverse proportion to the capacities of these condensers. According to my invention, I provide rubber insulation of specific inductive capacity approaching that of air and low enough to limit that part of the total voltage stress taken across the adjacent air space to a value such that the formation of visual corona or other destructive discharges or ozone is avoided or minimized.

The improved insulated electric power cable of the present invention comprises a conducting element, or a plurality of conducting elements, not less than 0.101 inches in diameter enclosed in rubber insulation of wall thickness not less than 0.078 inches, this insulating wall having a mean specific inductive capacity not exceeding 4.0, or better not exceeding 3.9 or 3.8.

Figure 2:
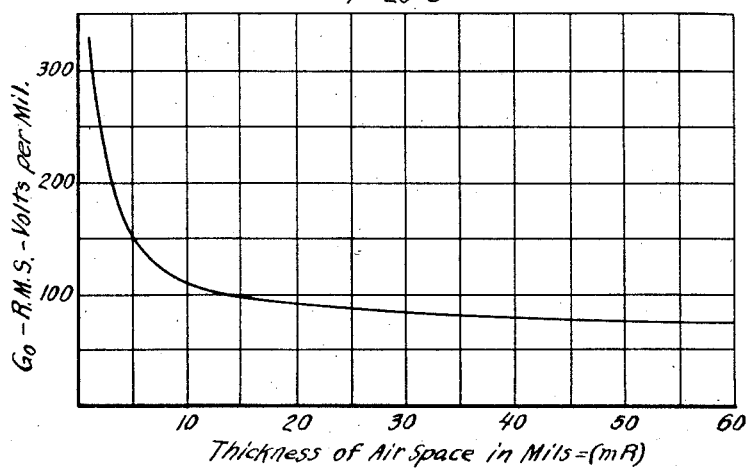
Figure 3:
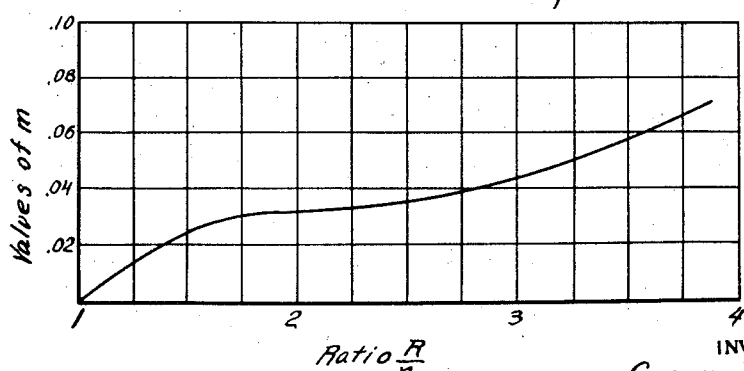

Referring to the accompanying drawings, Fig. 1 is an explanatory diagram of a cable section, Fig. 2 is a tabulation of typical values of the critical disruptive voltage for air, Fig. 3 is a tabulation of values of a factor useful in designing cables in accordance with the invention, and Fig. 4 is a graphic representation of the operation of the invention.

Referring to Fig. 1, along any elementary section B—B, the voltage stress between the cable conductor and the ground is divided across a thickness of insulation $a_1$ and a thickness of air $a_2$. The insulation proper is designed to withstand the voltage stress imposed upon it in operation of the cable. Since the specific inductive capacity of air approximates unity, however, the specific inductive capacity of rubber insulation used in the construction of this type of cable hitherto having been high and the voltage stress along the element B—B dividing across $a_1$ and $a_2$ in inverse proportion to the capacity of the air and insulation, the voltage stress across $a_2$ usually exceeds the value at which the formation of visual corona or other destructive discharges or ozone begins. According to the present invention, the specific inductive capacity of the rubber insulation is limited to a value such that the voltage stress across the air space $a_2$ is less than that causing the formation of visual corona or other destructive discharges or ozone. It will be noted that as the thickness of the air space $a_2$ decreases with decrease of the angle $\phi$, the critical disruptive voltage across the air space increases.

In electric power cables, with conducting elements not less than 0.101 inches in diameter, with commercial thicknesses of rubber insulation, 0.078 inches and upwards, the mean specific inductive capacity of the rubber insulation should not exceed 4.0, or better 3.9 or 3.8, as noted above.

The exact limiting value of the mean specific inductive capacity of the insulation necessary to secure the advantages of the invention depends upon the operating voltage, the conductor diameter, the outside diameter of the cable, the configuration of air spaces adjacent the cable, and the air temperature and pressure. I have found that this limiting value can be expressed as follows:

$$\frac{G_o(R-r)}{V-mRG_o}$$

where $G_o$ is the critical voltage causing formation of visual corona in air in R. M. S. volts per mil of air under operating conditions, R is the radius of the cable including the insulation in mils, $r$ is the radius of the conductor in mils, V is the maximum operating voltage in R. M. S. volts and $m$ is a factor fixed by the critical value of angle $\phi$ (see Fig. 1). Values for $m$ are given in Fig. 3. $G_o$ represents a well known property of air.

For example, assume a single #6 (American wire gauge) solid conductor to be covered with rubber insulation of 7/32 inch wall thickness as a cable for operation under a maximum voltage of 7,000 R. M. S. volts, substituting in the above formula, $G_o=93.5$, R=300, $r=81$ and $m=0.0642$, the mean specific inductive capacity of the insulation should not exceed about 3.95.

Referring to Fig. 4, the operation of the invention is illustrated by four examples of a single #6 solid conductor covered with rubber insulation of 7/32 inch wall thickness under 7,000 volts. As this diagram shows, the critical disruptive voltage across the adjacent air space is exceeded over a large part of the periphery of the cable where the specific inductive capacity ($k$) of the rubber insulation is 5.0 and 6.0. With rubber insulation having a specific inductive capacity of 3.0, the voltage stress across the air space adjacent the cable at no place reaches the critical disruptive value.

The following examples of rubber insulated cables embodying the invention will further illustrate the invention:

Single conductor cable

| Conductor size | Insulating wall | Insulation inductive capacity | Operating voltage | Critical voltage |
|---|---|---|---|---|
| #4 stranded | 7/32" | 3.64 | 7,000 | 8,200 |
| #6 stranded | 7/32" | 3.05 | 7,000 | 12,800 |

Triple conductor cable

| Conductor size | Insulating wall | Insulation inductive capacity | Operating voltage | Critical voltage |
|---|---|---|---|---|
| #6 stranded | 3/32" on each conductor. 11/16" jacket | 3.56 | 2,300 | 6,720 |
| #1 stranded | 7/64" on each conductor. 13/64" jacket | 3.76 | 2,300 | 9,450 |

In the foregoing examples, the values tabulated under "critical voltage" are actually measured values of the voltage necessary to cause the formation of visual corona. In each case it will be noted that this voltage materially exceeds the operating voltage, thus with these cables under operating conditions the formation of visual corona, other destructive discharges, or ozone, is avoided or minimized.

Rubber insulating compositions suitable for use in the construction of cables in accordance with the invention are illustrated in the following examples. The third of these illustrative compounds is particularly useful as a jacket compound in that it is adapted to resist abrasion. An insulating wall may be made up of any one of these compounds, for example, or it may be made up of an inner covering of the first or second compound in a jacket of the third compound for example, or a plurality of conductors may be insulated separately with the first or second compound and the group of insulated conductors jacketed with the third compound, for example. The use of a separate jacket compound is not essential in either single or multi-conductor cables as far as electrical properties are concerned.

Compound No. 1

|   | Parts |
|---|---|
| Smoked sheets | 42 |
| Reclaimed rubber | 25 |
| Zinz oxide | 12 |
| Litharge | 5 |
| Mineral rubber | 20 |
| Paraffine | 1 |
| Anti-oxidant | 9/16 |
| Accelerator | 10/16 |
| Sulphur | 35/16 |

The anti-oxidant may consist of the condensation product of acetaldehyde and alpha-naphthylamine. The accelerator may consist of a mixture in equal parts of diphenylguanidine and the condensation product of acetaldehyde and aniline (the commercial accelerator A–19).

Compound No. 2

|   | Parts |
|---|---|
| Smoked sheets | 30 |
| First crepe | 33 |
| Mineral rubber | 30 |
| Zinc oxide | 10 |
| Ozokerite | 2 |
| Anti-oxidant | 9/16 |
| Accelerator | 13/16 |
| Sulphur | 40/16 |

The anti-oxidant may be the same as in the preceding compound. The accelerator may consist of a mixture of six parts of diphenylguanidine and seven parts of the condensation product of acetaldehyde and aniline.

Compound No. 3

|   | Parts |
|---|---|
| Smoked sheets | 30 |
| First crepe | 33 8/16 |
| Zinc oxide | 40 |
| Carbon black | 2 |
| Accelerator | 15/16 |
| Selenium | 15/16 |
| Sulphur | 40/16 |

The accelerator may consist of a mixture of seven parts of diphenylguanidine and 8 parts of the condensation product of acetaldehyde and aniline. All these compounds may be vulcanized in the usual way in the usual wire insulating apparatus. These three compounds may be cured, for example, for ½ to 1 hour at 275–285° F. As insulation, the first compound has a specific inductive capacity in the neighborhood of 3.5–4.0, the second in the neighborhood of 3.0–3.3, and the third in the neighborhood of 3.5–4.0.

It will be understood that the thickness of the wall of insulation is proportioned with respect to the voltage under which the cable is to be operated in accordance with the usual practice, a sufficient thickness of insulation of sufficient dielectric strength being provided to prevent direct rupture, allowing an appropriate safety factor. The insulating value of the cable insulation is improved by my invention indirectly rather than directly; my invention relieves the insulation of a deteriorating influence to which such insulation is usually subjected in high voltage power installations, but the insulation per se in the improved cable of the invention must still be sufficient to avoid direct rupture under the operating voltage to which the cable is subjected in use. Referring to Fig. 1, for example, the insulation must be sufficient to prevent direct rupture along the elementary section A—A, and if the insulation is sufficient in this respect it will of course be sufficient to avoid direct rupture along any elementary section B—B, where part of the voltage stress is distributed across an adjacent air space; my invention relates primarily to the elimination of excessive voltage stress across the air space as typified at $a_2$ and in practice may involve an increase across the section of insulation as typified at $a_1$.

My invention is applicable in connection with both single conductor and multi-conductor cables.

In one aspect, this invention makes possible construction of alternating current cables with rubber insulation of the same wall thickness but having a materially higher factor of safety or a longer period of useful life as compared to cables previous available, or in another aspect this invention makes possible the construction of satisfactory alternating current cables with rubber insulation of wall thickness materially less than hitherto considered necessary, or these advantages may each be obtained in varying degrees. The important advantage of the improved rubber insulated electric power cable of the invention include greater reliability and longer life and particularly freedom from deterioration due to the usually encountered formation of visual corona or other destructive discharges or ozone.

I claim:

1. An electrical system comprising a source of electric current at a potential of at least 2300 volts, means for utilizing said current and a means for conveying said current from said source to said utilizing means comprising a rubber insulated electric conductor, comprising a conducting element not less than 0.101 inches in diameter enclosed in rubber insulation of wall thickness not less than 0.078 inches, said rubber insulating wall having a mean specific inductive capacity not exceeding 4.0.

2. An electrical system comprising a source of electric current at a potential of at least 2300 volts, means for utilizing said current and a means for conveying said current from said source to said utilizing means comprising a rubber insulated electric conductor, comprising a conducting element not less than 0.101 inches in diameter enclosed in rubber insulation of wall thickness not less than 0.078 inches, said rubber insulation wall having a mean specific inductive capacity not exceeding 3.9.

3. An electrical system comprising a source of electric current at a potential of at least 2300 volts, means for utilizing said current and a means for conveying said current from said source to said utilizing means comprising a rubber insulated electric conductor, comprising a conducting element not less than 0.101 inches in diameter enclosed in rubber insulation of wall thickness not less than 0.078 inches, said rubber insulating wall having a mean specific inductive capacity not exceeding 3.8.

4. An electrical system comprising a source of electric current at a potential of at least 2300 volts, means for utilizing said current and a means for conveying said current from said source to said utilizing means comprising a rubber insulated electric cable comprising a plurality of conducting elements each enclosed in rubber insulation and a jacket of rubber insulation enclosing the several separately insulated conducting elements, said rubber insulation having a mean specific inductive capacity not exceeding 4.0.

5. An electrical system comprising a source of electric current at a potential of at least 2300 volts means for utilizing said current and means for conveying said current from said source to said utilizing means comprising a rubber insulated electric conductor comprising a conducting element not less than 0.101 inches in diameter enclosed in rubber insulation of wall thickness not less than 0.078 inches, said rubber insulating wall having a mean specific inductive capacity not exceeding the value of the expression $$\frac{G_o x (R-r)}{V - m R G_o}.$$

In testimony whereof I affix my signature.
GEORGE JACKSON CROWDES.